United States Patent [19]

Amikura et al.

[11] Patent Number: 4,673,806

[45] Date of Patent: Jun. 16, 1987

[54] AUTOMATIC FOCUS ADJUSTING DEVICE

[75] Inventors: Takashi Amikura, Tokyo; Akihiro Fujiwara, Kanagawa, both of Japan

[73] Assignee: Canon Kabushiki Kaisha, Tokyo, Japan

[21] Appl. No.: 679,909

[22] Filed: Dec. 10, 1984

[30] Foreign Application Priority Data

Dec. 13, 1983 [JP] Japan ................................ 58-234600

[51] Int. Cl.[4] ............................................. G01J 1/20
[52] U.S. Cl. .................................... 250/201; 250/204
[58] Field of Search ....................... 250/201 AF, 204; 354/400, 402, 403

[56] References Cited

U.S. PATENT DOCUMENTS 4,383,168  5/1983  Luck .............................. 250/201 AF

*Primary Examiner*—Gene Wan
*Attorney, Agent, or Firm*—Toren, McGeady and Goldberg

[57] ABSTRACT

In the disclosed automatic focus adjusting device of the active type having a light emitting element for projecting light for focus detection onto an object to be photographed, light emitting operation and non-light emitting operations of the light emitting element are periodically effected, and the duty ratio or frequency of the light emitting period is variable.

10 Claims, 10 Drawing Figures

AUTOMATIC FOCUS ADJUSTING DEVICE

BACKGROUND OF THE INVENTION

1. Field of the Invention

This invention relates to an automatic focus adjusting device and, more particularly, to a device in which focus detecting light is projected onto an object and focus adjustment is in response to a signal based on the light reflected from the object.

2. Description of the Prior Art

An automatic focus adjusting device having a light projecting element for projecting light for focus detection onto an object to be photographed and a light receiving element for receiving the light reflected by the object, for controlling an imaging optical system moving to an in-focus position on the basis of an output signal of the light receiving element, is well known.

Previously disclosed, in U.S. patent application Ser. No. 603,660 filed Apr. 26, 1984, is an automatic focus detecting device in which the above light receiving element is divided into two photo-sensitive areas for receiving reflected light, and output signals of the photo-sensitive areas are detected and processed to compute and control the direction of movement of the imaging optical system (infinity distance direction or nearest distance direction) and the quantity of movement thereof (quantity or time of a current supplied to a motor).

In the automatic focus detecting device having the light projecting element for projecting light onto an object and the light receiving element for receiving the light reflected by the object, quantities of light received by the two photo-sensitive areas are converted into electrical signals. The converted electrical signals are integrated and processed to become output signals VA and VB produced by the photo-sensitive areas, an absolute value signal |VA−VB|, which is an absolute value of the difference between the output signals VA and VB, and a sum signal VA+VB. On the basis of these signals, signals (DD, LL, HH) are produced for detecting whether an object image formed by a photographic lens is in a near-focus condition, in-focus or out-of-focus. Furthermore, on the basis of these signals (DD, LL, HH), a synchronizing signal SYNC for light emission of the light projecting element, motor driving signals FF, NN and LOW, etc. are controlled by a sequence control circuit.

The electrical circuit arrangement associated with the automatic focus detecting device described above is shown in FIG. 1. A reflected light spot image received at photosensitive areas 6A and 6B of a light receiving element 6, as mentioned in the foregoing, is photo-electrically-converted into light information signals. The light information signals thus obtained are supplied to and sufficiently amplified by amplifiers 101a and 101b. The amplifiers 101a and 101b preferably have a sufficient degree of amplification for the modulated frequency of an infrared ray to form the light spot image, and to have a frequency characteristic of suppressing, as much as possible, the degree of amplification for the frequency of such modulated light such as unnecessary sunlight or commercial light sources. Outputs of the amplifiers 101a and 101b are supplied to synchronized detection circuits 102a and 102b and are subjected to synchronized detection. In this case, the synchronizing signal is of the same frequency as that of a light emission driving signal for a light projecting element 3 and is kept in a constant phase relation thereto. Outputs of the synchronized detection circuits 102a and 102b are integrated by integration circuits 103a and 103b and increase, sometimes gradually, at a rate proportional to the signal intensity of the reflected light spot image. The integrated voltages VA and VB which are obtained from the integration circuits 103a and 103b, respectively, through the above signal processing operation are processed and determined by a computing circuit which will be described later herein, and are thus converted into digital information consisting of some bits.

More specifically, the integrated voltages VA and VB are made into a difference signal VA−VB by a subtracter 104 and into a sum signal VA+VB by an adder 105. The difference signal VA−VB is supplied to an absolute value circuit 106 to produce the signal |VA−VB|. The value of this signal |VA−VB| is compared with a comparison value VD by a comparator 107 operating as comparison means, and the result of comparison is produced by the comparator 107. The sum signal VA+VB is compared with comparison values VL and VH by comparators 108 and 109 operating as level detecting means, respectively, and comparison results are produced by the comparators 108 and 109. In addition, the integrated voltages VA and VB are compared with each other by a comparator 110, and the comparison result is produced by the comparator 110.

FIG. 2 shows a situation where part of a sequence control circuit 111 is embodied by hardware means. A clock CL determines the minimum period of the sequence control circuit 111 and serves as a signal source for modulation of light emission of the light projecting element 3 and a synchronizing signal SYNC for the synchronized detection circuits 102a and 102b. A counter 236 counts an n-number and produces an output Cn which determines the period of distance measurement and the maximum integration time. Flip-flops 237 and 238 are set by the signals DD and HH, respectively, and are reset by the signal Cn at every period of distance measurement. Respective outputs DDQ and HHQ of the flip-flops 237 and 238 are integration terminating signals. These signals DDQ and HHQ are supplied through an OR circuit 239 to a flip-flop 240 to be held there based on the period of the signal Cn. Inverting output $\bar{Q}$ of the flip-flop 240 becomes an infinity signal FAR. The signals FAR and DDQ come through an OR circuit 241 to set a flip-flop 242, which then produces a motor rotation signal MO. This flip-flop 242 is also reset by the integration terminating or in-focus signal HHQ. At the time of an in-focus condition, the motor rotation signal MO is inhibited from being produced and a motor 8 is thus stopped. The signal AB is renewed into a signal ABQ by a flip-flop 243 in response to the signal DDQ which represents an out-of-focus condition. In this case, a signal AB becomes true logic at the time of a near-focus condition, i.e. VA>VB. The signals ABQ and FAR become a signal FN indicating the rotating direction of the motor 8 through an OR circuit 244. A final motor driving signal FF (in the direction of an infinity distance position) or NN (in the direction of a close-up distance position) is selected based on the output of an AND circuit 245 which receives the signals FN and MO or the output of an AND circuit 247 which receives the signal FN through a NOT circuit 246 and the signal MO.

Where both the signals DDQ and HHQ are of false logic and are supplied through the OR circuit 239 and NOT circuit 248 to an AND circuit 249, the synchronizing signal SYNC is synchronized with an output CLK of the clock CL which is supplied to the AND circuit 249. An integration resetting signal CLR produced by an OR circuit 250 becomes true logic and remains so until resumption of the next integrating process, after termination of integration is decided jointly by the output of the OR circuit 239 and the signal Cn supplied to the OR circuit 250.

FIG. 3 shows wave forms of FIG. 2 signals observed when the focus changes as follows: A near-focus state→a far-focus state→an in-focus state→an infinity distance state. In near-focusing, the signal DD first rises. At this instant, the signal AB is at a high level. In far-focussing, the signal DD also first rises while the signal AB is at a low level. In the event of an in-focus condition, the signal HH rises. In the event of an infinite distance, the end of a maximum integration time comes before any of the signals rise.

FIG. 4 shows an example in which a micro-computer is used as the sequence control circuit 111 to accomplish control with soft-ware employed in part of the device according to the invention. In this drawing are also shown, by way of example, a light emission driving circuit 112 for the light projecting element 3 and a motor driving circuit 113. Reference numeral 251 identifies a micro-computer (the inside of which is arranged, for example, as shown in FIG. 18). Input terminals of the micro-computer 251 receive the signals DD, AB, LL and HH. From output terminals of the micro-computer 251 are produced the signals SYNC, CLR, FF and NN. Furthermore, a signal LOW for the motor 8 rotation speed control, etc. can be readily added to these signals.

A current flowing to the light projecting element 3 is switched in response to the signal SYNC through transistors 252 and 253.

A current flowing to the motor 8 is switched in response to the signals FF and NN through transistors 254 - 257 to flow either in the forward or reverse direction. A voltage control circuit is composed of transistors 258 and 259 and a diode 260. A voltage applied to the motor 8 is shiftable in two steps in response to the signal LOW. Reference numerals 261 and 262 identify respectively a nearest distance switch and an infinity distance switch. These switches 261 and 262 close when the phototaking optical system reaches the nearest and infinity distance end positions to prevent it from being driven further than these end positions.

FIG. 5 shows the wave forms of the synchronizing signal SYNC and the clearance signal CLR of the circuit 250 of FIG. 2, a light emitting period signal IRED for the light projecting element 3, and integration outputs INT of the integration circuits 103a and 103b of FIG. 1.

(The Problem of the Prior Art)

In the conventional device of FIGS. 1 to 5, the circuit of FIG. 2 is so constructed that the AND circuit 249 produces the synchronizing signal SYNC, and, in synchronization with this synchronizing signal SYNC, the light projecting element 3 produces light, as the output wave form IRED, while the clearance signal CLR is produced. Because the output wave form IRED of the light emitting signal of the light projecting element 3 is synchronized with the synchronizing signal SYNC, the emitting and non-emitting operation is performed at a prescribed frequency and at a prescribed constant duty ratio. Therefore, the integration outputs of the integrator circuits 103a and 103b increase at a constant integration ratio, as shown in the output wave form INT in FIG. 5. In FIG. 5, it is at the 5th shot of light counting from the start of light emission that the output value of $V_{II}/2$ is reached. Because, in this case, the amount of light emitted in a pulse is large, it is uncertain at what that time during the point of 5th shot light emitting time that the value $V_{II}/2$ has been reached. This leads to more than adequate light emission depending on the photographic situation.

Particularly when the object to be photographed is highly reflective, since the amount of light reflected from the object is great, the integrated amount for one shot of light emission by the integrator circuit becomes large, making it difficult to achieve fine or small quantity when the integration output is quantitized.

In the device shown in FIGS. 1 to 5, when the light emitting period is constant, it is difficult, when the amount of light emitted has reached a sufficient level, to control whether light emission stops, or only necessary light emission is carried out.

An object of the present invention is to reduce the integration error by lessening the integrated quantity of the integrator circuit per unit of light emission within a time, from the start to the termination of light emission, at which the integration output of the integrator circuit reaches a predetermined value.

Another object of the present invention is to provide a device in which without shortening the reaching distance of emitted light, for example, with the same reaching distance as that of the conventional example of FIGS. 1 to 5, for a highly reflective object to be photographed, the accuracy of the integration output can be heightened.

SUMMARY OF THE INVENTION

To accomplish the above objects, the present invention provides a focus adjusting device with means for varying the duty ratio of the light emitting period, or the frequency, of light emitting means for emitting light for focus detection, and particularly to provide a light emission control device.

An automatic focus adjusting device including a light emitting means for producing light for focus detection to an object to be photographed, and performing a light emitting operation and a non-light emitting operation periodically; light receiving means including at least one pair of elements receiving the reflected light from the object; and means for generating a drive signal of the light emitting means, the generating means producing a pulse signal for driving the light emitting means on the basis of the output signal of the light receiving means, and including altering means for varying the duty ratio of the pulse signal.

BRIEF DESCRIPTION OF THE DRAWINGS

FIG. 8 is a circuit-construction diagram.

FIG. 9 shows wave forms of the main output signals of FIG. 8.

FIG. 10 illustrates the construction of the frequency varying circuit 1020.

DETAILED DESCRIPTION OF THE PREFERRED EMBODIMENTS

Figure 6:
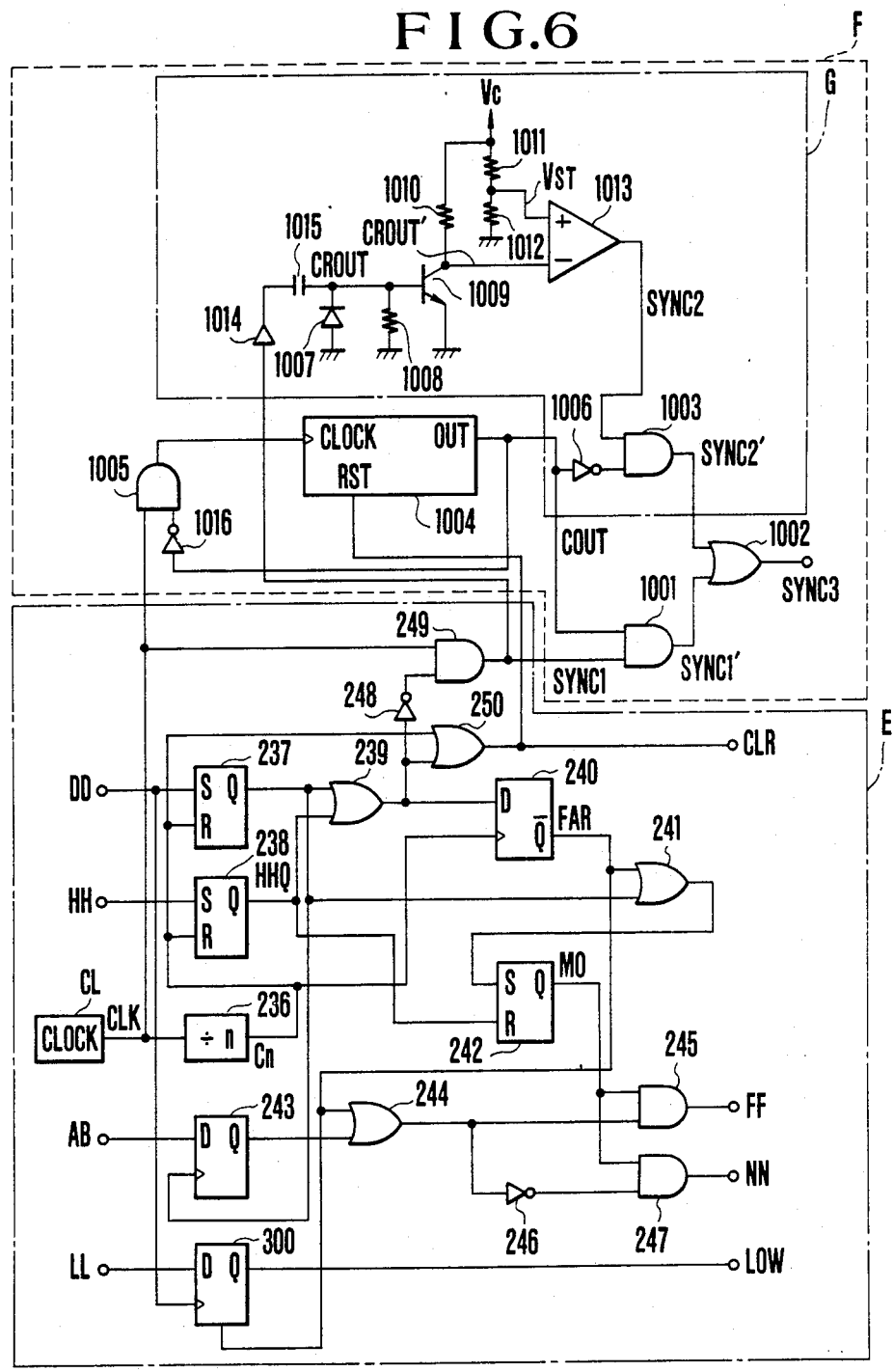
FIG. 6 is an electrical circuit diagram of an embodiment of the present invention.
Figure 7:
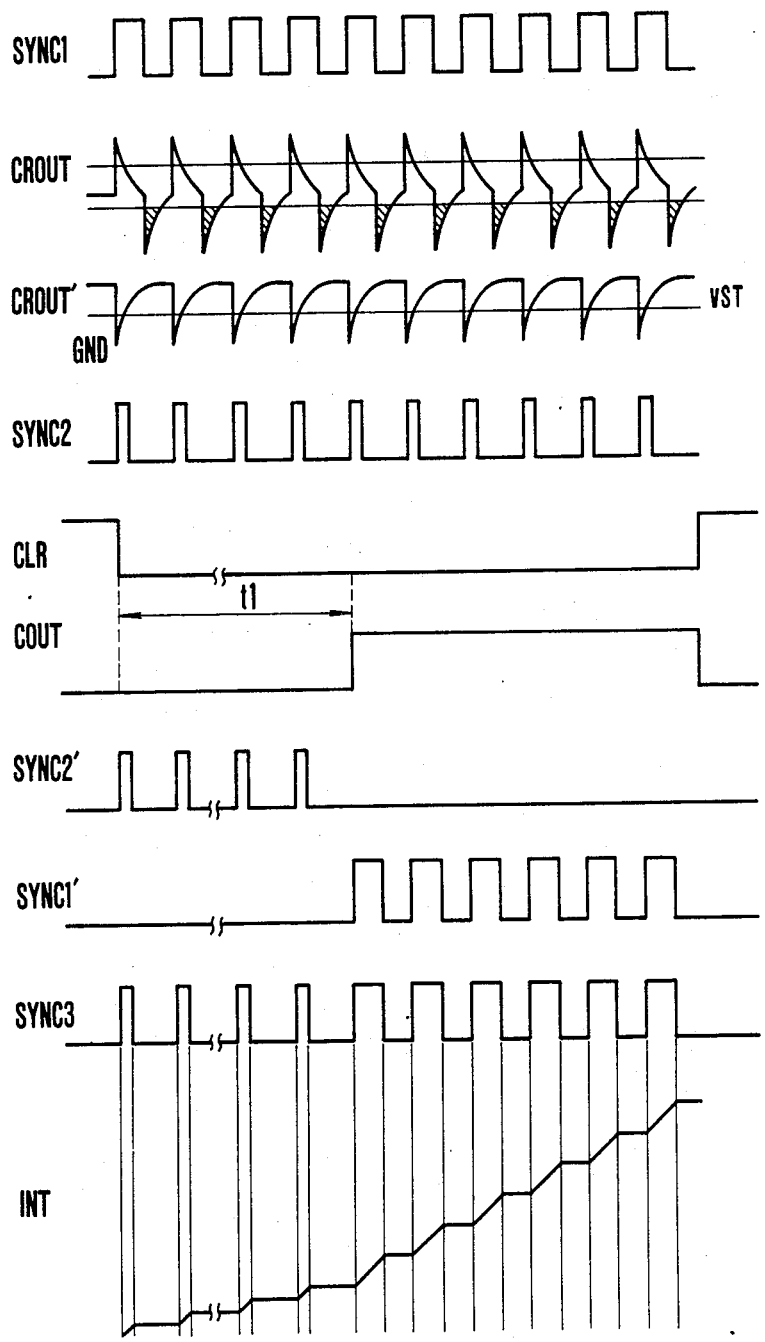
FIG. 7 shows wave forms of the various output signals of the circuit of FIG. 6.

An embodiment of the present invention is next described in great detail by reference to FIGS. 6 and 7.

Figure 1:
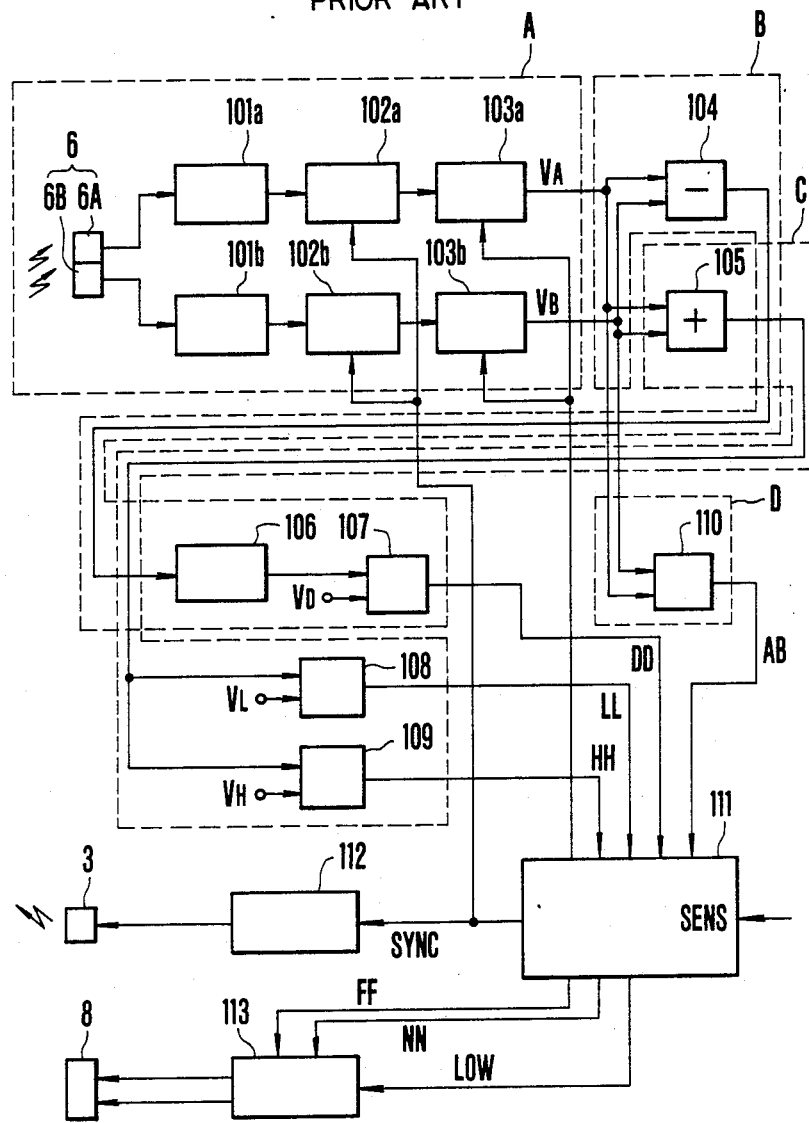
FIGS. 1, 2 and 4 are electrical circuit diagrams of the conventional automatic focus adjusting device.
Figure 2:
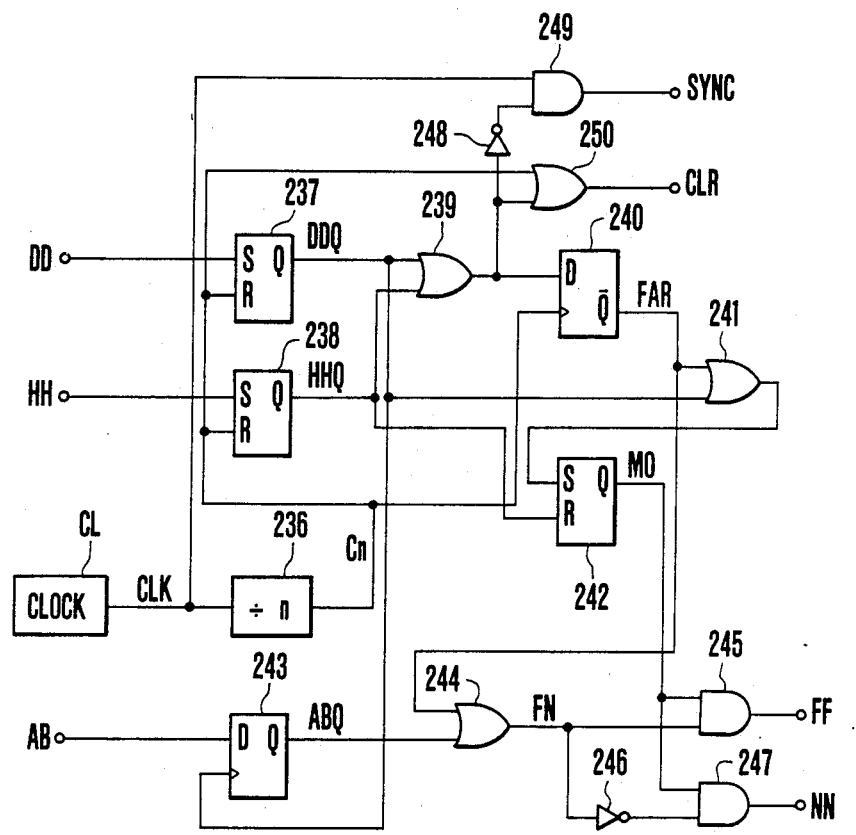
Figure 3:
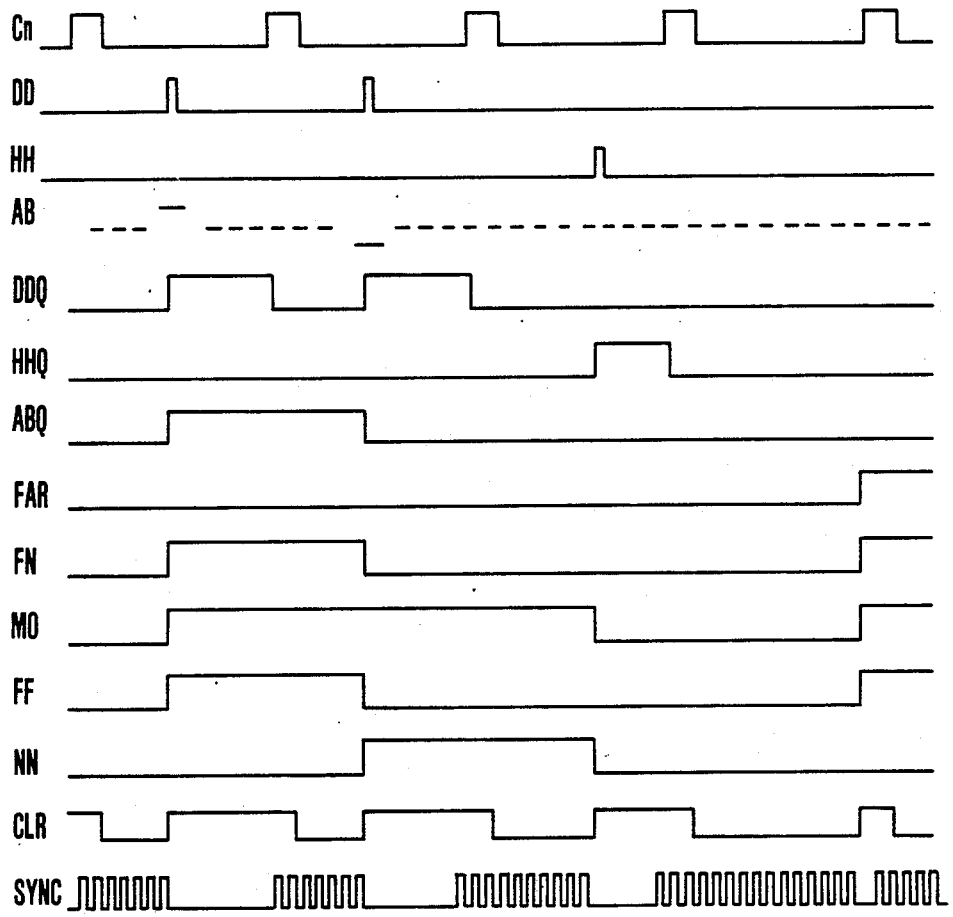
FIG. 3 shows wave forms of the various output signals of the aforesaid circuit.
Figure 4:
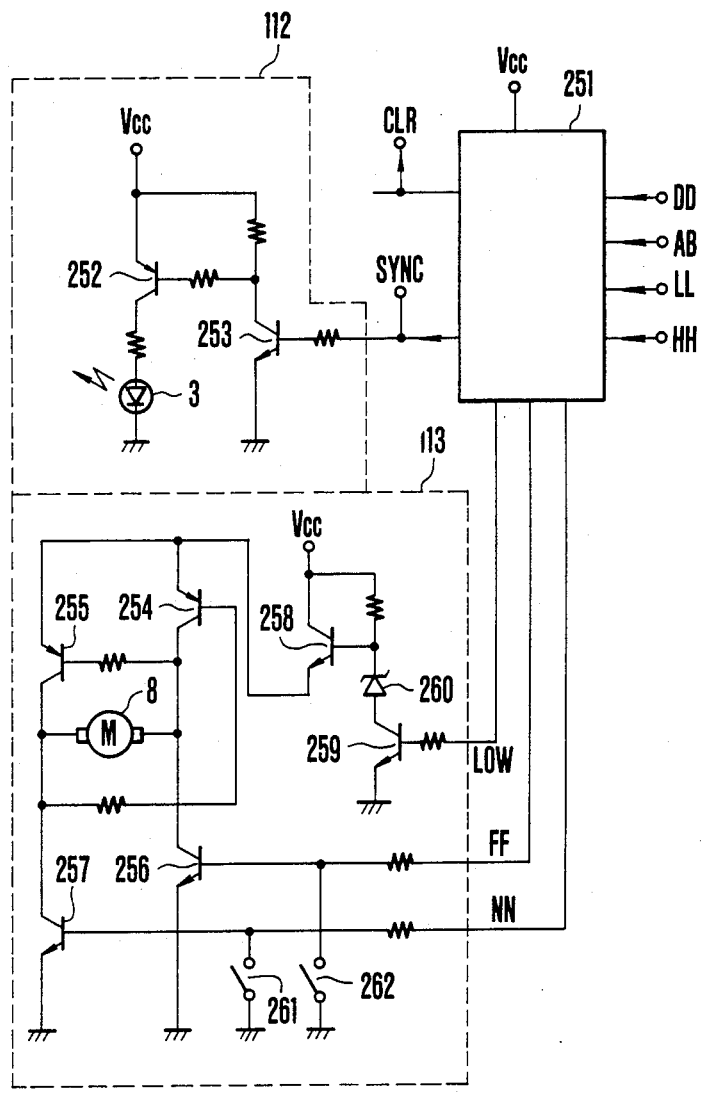
Figure 5:
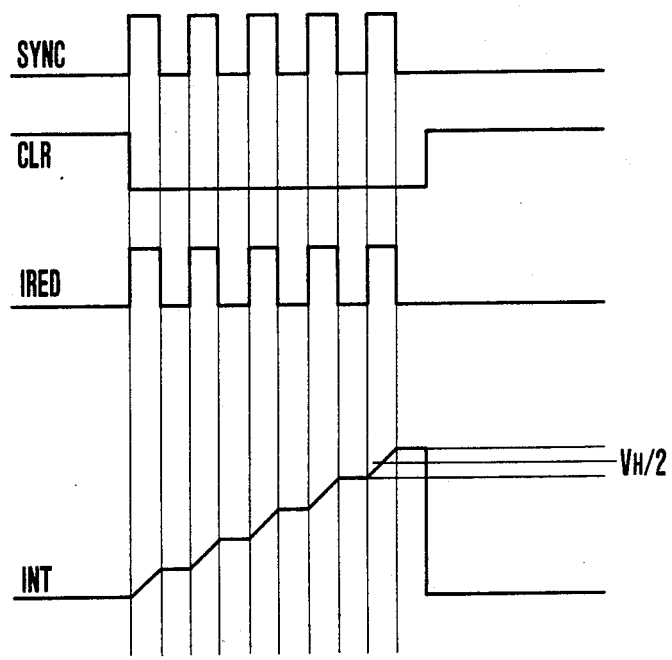
FIG. 5 is a diagram of the output wave forms of the aforesaid circuit.

A block E shown by a dot-and-dash line in FIG. 6 is a circuit for producing a light emitting signal SYNC1, control signals FF and NN for the motor drive circuit 113, and a clearance signal CLR-LOW on the basis of the signals DD and HH and the signals AB and LL produced from the circuit shown in FIG. 1. The construction and operation of the circuit is similar to that of FIG. 1, and, therefore its explanation is omitted. Another block F, shown by a dashed line, illustrates the construction of a circuit for altering the duty ratio of the drive signal for the light emission drive circuit 112 for the light projecting element 3. In the block F, 1001, 1003, 1005 are AND circuits; 1002 is an OR circuit; 1004 is a counter; 1006 and 1016 are inverters; and 1014 is a buffer circuit.

Reference numeral 1007 identifies a diode; 1008, 1010, 1011, 1012 identify resistors; 1015 a capacitor; 1009 a transistor; and a comparator 1013 has two inputs connected to the collector of the transistor 1009 and the output of a voltage divider of the resistors 1011 and 1012.

The counter 1004 receives the logical sum of the clock signal CLK and the output of the inverter 1006 through the AND circuit 1005, has the clearance signal CLR as its resetting signal, and is released from resetting when the signal CLR signal becomes L (low), counting pulses during a prescribed period. And, after a prescribed number of pulses has been counted, or in a time t1 from the appearance of the signal CLR, the counter 1004 produces an H (high) signal at an out terminal thereof. The AND circuit 1001 constitutes a pulse forming means together with the counter 1004, which receives the output signal SYNC1 of the AND circuit 249 and produces an output signal SYNC1'.

The output of the AND circuit 249, or the synchronizing signal SYNC1, is also applied to a second pulse forming means G shown by a dot-and-dash line in FIG. 6, wherein the signal SYNC1 is applied through a buffer circuit 1014 to a differentiation circuit composed of a capacitor 1015 and a resistor 1008. The negative output wave form of an output CROUT of the differentiation circuit 1015 and 1008 is clipped by the diode 1007 so that the hatched portion of the output wave form CROUT is cut. The negative side-cut output CROUT is inverted by the transistor 1009 and the resistor 1010. Produced at the collector of the transistor 1009 is a wave form CROUT'. This signal is applied to the inverting input terminal of the comparator 1013. Applied to the non-inverting input terminal of the comparator 1013 is a voltage VST from a voltage divider of the resistors 1011 and 1012. When the aforesaid output CROUT' is smaller than the reference voltage VST, the comparator 1013 produces an output SYNC2 of H level, as shown as a line labeled SYNC2 in FIG. 7.

When the clearance signal CLR changes to an L level, the counter 1004 is released from resetting, and starts to count the clock signal CLK. When it finishes the counting of a prescribed number, as has been described above, a count COUT is produced. During a time interval from the start of light emission to a moment at which the counter 1004 produces the count COUT, the output of the counter 1004 is applied through the inverter 1006 to the AND circuit 1003. Also since the output SYNC2 of the comparator 1013 is applied to the other input of the AND circuit 1013, it is during the time t1 from the start of counting by the counter 1004 to the count termination of the prescribed number that the same signal as the signal SYNC2, say, SYNC2' is produced at the output terminal of the AND circuit 1003. Since the AND circuit 1001 of the aforesaid first pulse forming means is supplied with the signal SYNC1 and the output signal of the counter 1004, it is during the time when the output of the counter 1004, or the count COUT is L, that the output of the AND circuit 1001 is maintained at L. Since the counter 1004 has counted the prescribed number, when the count H becomes H, a wave form synchronized to the signal SYNC1, as shown by a line labelled SYNC1' in FIG. 7, is produced.

The OR circuit 1002 produces an output signal SYNC3, which is applied to the light emission drive circuit 112 of FIG. 1. As shown in FIG. 7, until the counted number of the counter 1004 reaches the prescribed number, the output signal SYNC3 of the OR circuit 1002 is the same as the signal SYNC2'. Since the counter 1004 has finished counting the prescribed number, when the count COUT produces the H signal, the output signal SYNC3 synchronized to the signal SYNC1 is produced.

FIG. 7 shows a wave form INT of the integration signal $V_A$ or $V_B$ integrated by the signal SYNC' and the signal SYNC2'. Of the SYNC signal, during a period of integration by the signal SYNC2', the time integrated per pulse is shorter so that the voltage value rising per pulse becomes low and it is possible to quantize more finely than with the prior art.

Also, if the object is not highly reflective, when integration is not completed even though integration by the pulse of the signal SYNC2' has expired since a prescribed time has elapsed, integration is continued by the signal SYNC1'. Therefore, the integration time per pulse becomes the same as with the prior art.

In the above-described construction, the duty ratio of the signal SYNC3 from the start of light emission to the t1 time can be altered by choosing the differential coefficient of the capacitor 1015 and the resistor 1008. By this differential coefficient, the integration amount of the integration output INT can be set. Also the time t1 in which the duty ratio is altered, that is, the time in which the light emitting signal with the suppressed integration amount is produced can be determined by setting the count number (count time) of the counter 1004.

Figure 8:
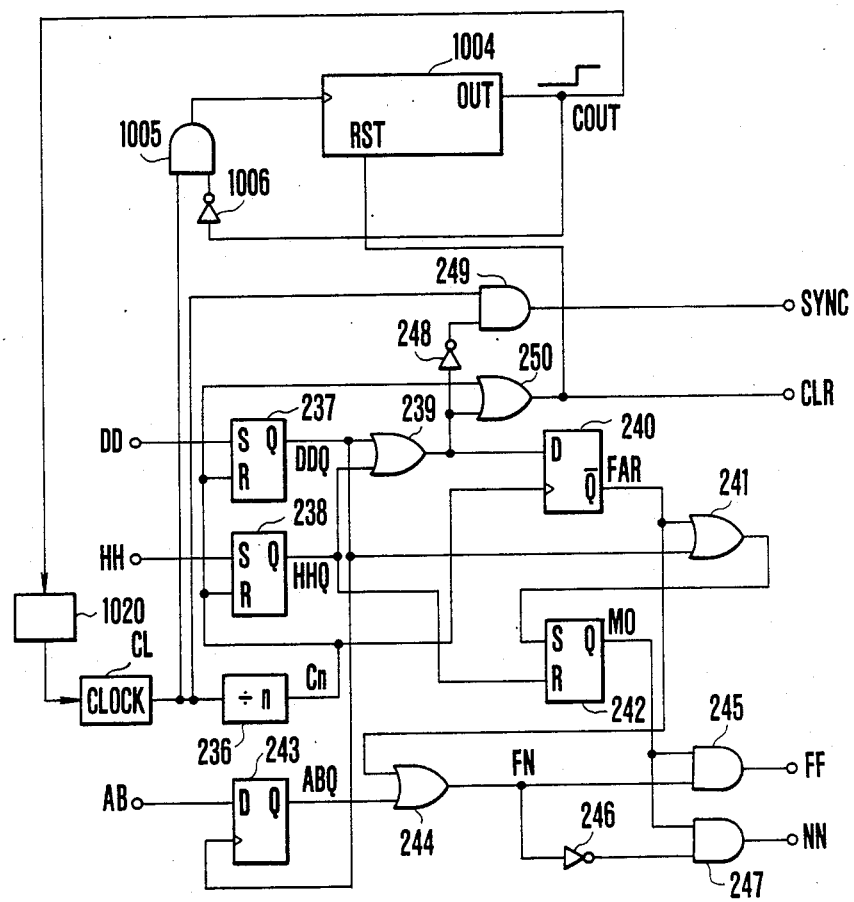
FIGS. 8 to 10 illustrate another embodiment of the invention.

FIG. 8 illustrates another embodiment in which the accuracy of quantization of the integrating operation of the output signal of the aforesaid light receiving element is improved by varying the frequency. In FIG. 8, the output signal COUT of the counter 1004 is applied to synchronizing signal frequency varying circuit 1020, and the output signal of said frequency varying circuit 1020 is applied to a synchronizing signal generating circuit CL.

Figure 9:
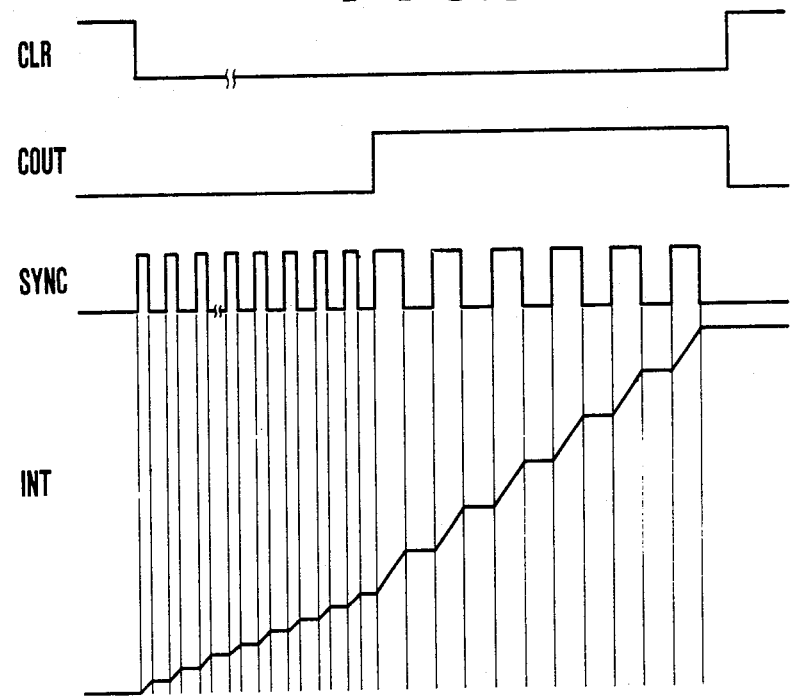

FIG. 9 illustrates wave forms of the main signals of FIG. 8.

The output of the counter 1004 is similar in wave form to the aforesaid one of FIG. 7. When the output signal of the counter 1004 is a low level signal as shown in FIG. 9, the frequency varying circuit 1020 produces a signal with a period of frequency f1. Therefore, the output signal SYNC is a signal of the frequency f1. When the counter 1004 has finished the counting of a prescribed time, the output signal of the counter 1004 becomes a high level signal. By this high level signal, the frequency varying circuit 1020 produces a different frequency f2 from the aforesaid frequency f1. Here assuming that f1>f2, the signal SYNC becomes an output wave form shown in FIG. 9. Therefore, the frequency of the signal SYNC is f1 from the start of measurement of the distance to the prescribed time, and thereafter becomes f2, so that the integration output of the integrator circuit becomes as shown by INT in FIG. 9.

Figure 10:
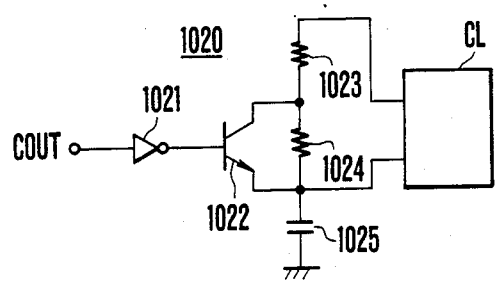

FIG. 10 illustrates a concrete construction of the frequency varying circuit 1020. The frequency varying circuit 1020 includes an inverter 1021, a transistor 1022, resistors 1023 and 1024 and a capacitor 1025. The frequency varying circuit 1020 has the resistors 1023 and 1024 and the capacitor 1025 constituting a CR circuit, and is arranged so that the input signal to the synchronizing signal generating circuit CL is altered by the time constant of the capacitor 1005 and the resistors 1023 and 1024.

As in the above, according to the present invention, by altering the duty ratio or the frequency of the light emitting period of light emitting means for measurement of the object distance, the accuracy of quantization when in the integrating operation of the output of the light receiving element is heightened. As a result of it, the accuracy of distance measurement can be heightened.

What is claimed is:

1. A device for measuring distance of an object, comprising:
   (a) a pulse generator for generating a plurality of pulses;
   (b) control means for changing width of the pulses of the pulse generator;
   (c) light emitting means for emitting light in response to the pulses changed by said control means;
   (d) receiving means for receiving light emitted by said light emitting means and reflected by said object; and
   (e) operating means for determining the distance of the oject on the basis of the light received by said light receiving means.

2. A device according to claim 1, wherein said control means changes the duty ratio of said pulses.

3. A device according to claim 2, wherein said control means changes the frequency of said pulses.

4. A focus adjusting device for an object, comprising:
   (a) a pulse generator for generating a plurality of pulses;
   (b) control means for changing width of the pulses of said pulse generator;
   (c) light emitting means for emitting light in response to the pulses changed by said control means;
   (d) light receiving means for receiving light emitted by said light emitting means and reflected by said object;
   (e) operating means for determining a distance of said object on the basis of the light received by said light receiving means; and
   (f) adjusting means for adjusting the focus on said object on the basis of the operation of said operating means.

5. A device according to claim 4, further comprising a counter for counting the pulses of the pulse generator.

6. A device according to claim 5, wherein said control means changes the pulse width of said pulse generator when said counter means counts a predetermined number of pulses.

7. A device according to claim 6, wherein said control means changes the duty ratio of the pulses.

8. A device according to claim 6, wherein said control means changes the frequency of the pulses.

9. A device for distance measurement adjustment of an object comprising:
   (a) pulse generator for generating a plurality of pulses;
   (b) light emitting means for emitting light in response to the pulses of the pulse generator;
   (c) light receiving means for receiving light emitted by said light emitting means and reflected by said object;
   (d) integrating means for integrating outputs of said light receiving means, said integrating means changing in integrating time; and
   (e) operating means for determining the distance of said object on the basis of the integration of said integrating means.

10. A device according to claim 9, wherein the integrating time of said integrating means gradually increases.

* * * * *